United States Patent [19]

Umezawa

[11] Patent Number: 4,658,295
[45] Date of Patent: Apr. 14, 1987

[54] VERTICAL CONTOUR CORRECTION DEVICE

[75] Inventor: Toshimitsu Umezawa, Kazo, Japan

[73] Assignee: Kabushiki Kaisha Toshiba, Kawasaki, Japan

[21] Appl. No.: 674,654

[22] Filed: Nov. 26, 1984

[30] Foreign Application Priority Data

Nov. 26, 1983 [JP] Japan ................. 58-221396

[51] Int. Cl.⁴ ............................................. H04N 5/14
[52] U.S. Cl. ...................... 358/166; 358/162
[58] Field of Search ............ 358/166, 162, 37, 38

[56] References Cited

U.S. PATENT DOCUMENTS

| 4,047,224 | 9/1977 | Yamaguti ................ 358/166 |
| 4,481,537 | 11/1984 | Tanaka .................. 358/162 |
| 4,558,347 | 12/1985 | Pritchard et al. ........ 358/166 X |
| 4,558,354 | 12/1985 | Tanaka .................. 358/166 X |

FOREIGN PATENT DOCUMENTS 55-19551  5/1980  Japan .

Primary Examiner—Howard W. Britton
Assistant Examiner—Victor R. Kostak
Attorney, Agent, or Firm—Schwartz, Jeffery, Schwaab, Mack, Blumenthal & Evans

[57] ABSTRACT

A vertical contour correction device for imparting preshoot and overshoot to a video signal from a video source and correcting the vertical contour of the video signal in the vertical direction as well as the horizontal direction. The contour device utilizes only a single delay means and a plurality of amplifiers which have their gains and polarities fixed at a predetermined relationship with one another.

8 Claims, 33 Drawing Figures

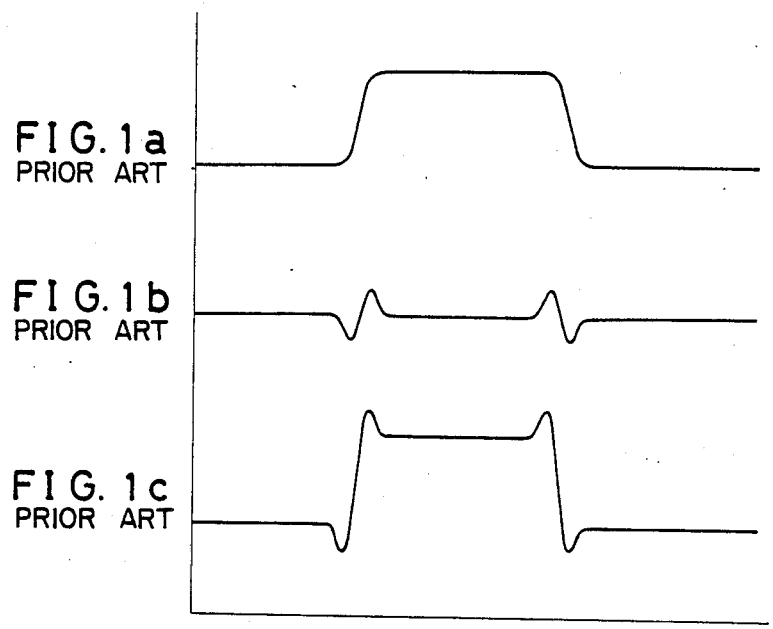
FIG. 1a PRIOR ART
FIG. 1b PRIOR ART
FIG. 1c PRIOR ART
FIG. 2 PRIOR ART
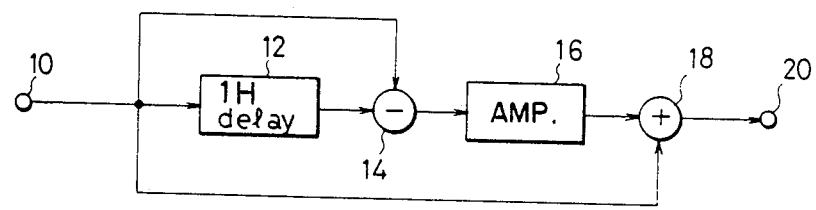

FIG. 5 PRIOR ART
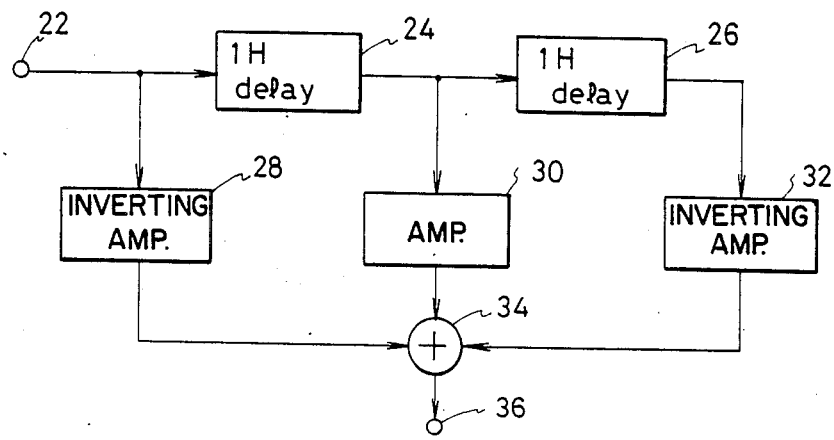
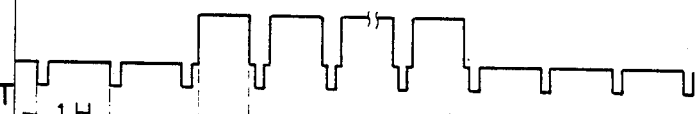
FIG. 6a PRIOR ART
FIG. 6b PRIOR ART
FIG. 6c PRIOR ART
FIG. 6d PRIOR ART
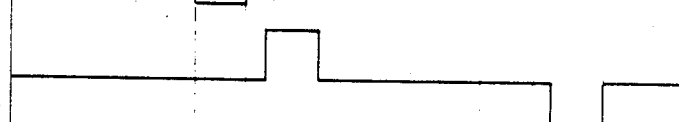
FIG. 6e PRIOR ART
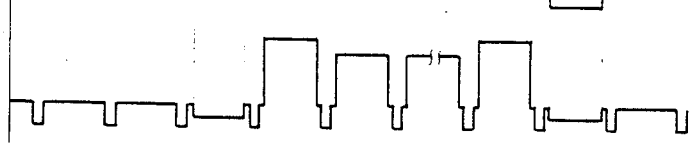
FIG. 6f PRIOR ART FIG.7
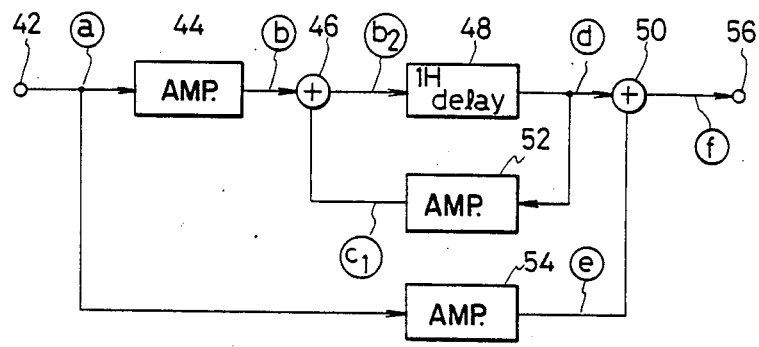
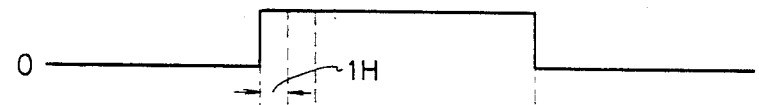
FIG.9a
FIG.9b
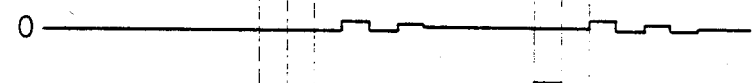
FIG.9c
FIG.9d

VERTICAL CONTOUR CORRECTION DEVICE

BACKGROUND OF THE INVENTION

1. Field of the Invention

The present invention relates to a vertical contour correction device in a picture imaging apparatus for color television receivers and the like, and in particular to a vertical contour correction device adapted to give simultaneously preshoots and overhoots to the contour portion in the vertical direction.

2. Description of the Prior Art

The bandwidth of the video signals of the transmitting and receiving system for television is generally limited 4.2 MHz. Signal components in the higher frequency band than this are not transmitted so that there exist in principle a phenomenon such as rounding in fine portions or edge portions of the original pattern, which constitutes the main factor for the degradation of the sharpness of the television pictures produced.

To improve sharpness, there has been known a technique of adding preshoots and overshoots in the front and rear of the edge portion of the video signal. This will be described by referring to FIGS. 1a to 1c.

When an image signal which varies in the step fashion as shown in FIG. 1a is inputted, a contour correction signal can be obtained by taking the first and second derivatives of the signal. FIG. 2b shows an example of the twice differentiated waveform. The contour correction is accomplished by obtaining a signal with a preshoot and an overshoot, as shown in FIG. 1c, through superposition of the wave-form signal shown in FIG. 1(b) onto the input signal shown in FIG. 1(a).

However, the contour correction as described above has the following problem. Namely, to obtain the twice-differentiated waveform a circuit which includes an inductor, a capacitor, and a resistor is usually used. This means basically that contour correction can be achieved only for the horizontal direction of the reproduced picture.

In a transmitting and receiving system for television, the grayishness of the picture element is converted to an electrical signal continuous in time by scanning the picture on the transmitting side of the picture. The signal is reproduced on the receiving side of the picture as a two-dimensional picture by carrying out assembly scanning synchronous with the decomposition scanning of the picture on the transmitting side. Because of this, the signal at the time earlier by one horizontal scanning period (1H) is needed in order to give a contour correction for the vertical direction of the picture.

Signals at a time earlier by 1H may be obtained by the use of a delay circuit like a charge coupled device (CCD), and a prior art device for accomplishing vertical contour correction by means of such a delay circuit is described below.

Namely, the prior art vertical contour correction device comprises a 1H delay circuit (referred to as 1H delay line hereafter) of a CCD or like kind connected to the input terminal of the video signal, a subtraction circuit for subtracting the output signal of the 1H delay line from the video signal, an amplifier for adjusting the amplitude of the output signal of the subtraction signal with a prescribed amplification factor, and an addition circuit for outputting the result of adding the signal from the amplifier to the input video signal.

With a correction circuit of the above construction, it is possible to obtain an output signal waveform with overshoot added on at the leading edge and the trailing edge in the vertical direction.

It is noted that, although a correction circuit which adds overshoots is described in the foregoing, a circuit which is to add preshoots should also be inferred readily.

However, such a correction where only one of overshoot or preshoot is added is not quite satisfactory because of the unnatural result of the reproduced picture, though admittedly it improves the sharpness to some degree. For this reason, it has been desired to add the overshoot and the preshoot at the same time.

To resolve this problem, there has been provided a vertical contour correction device which is adapted to give the preshoot and the overshoot at the same time. This prior art vertical contour correction device comprises a first 1H delay line connected to a input terminal of the video signal, a second 1H delay line connected to the output terminal of the first 1H delay line, a first inverting amplifier for inverting and amplifying the input video signal, an amplifier for amplifying the output signal of the first 1H delay line, a second inverting amplifier for inverting and amplifying the output signal of the second 1H delay line, and an adder for outputting the sum of the output signals of the first and second inverting amplifiers and the amplifier.

By the use of vertical contour correction device as described above, it is possible to obtain an output signal waveform which has preshoots and overshoots at the vertical leading edge and the vertical trailing edge.

However, a vertical contour correction device as described above creates a new disadvantage in that it requires two 1H delay lines so that the circuit involved becomes large when constructed with a delay circuit like a CCD.

SUMMARY OF THE INVENTION

An object of the present invention is to provide a vertical contour correction device which is adapted to furnish preshoots and overshoots in an well balanced manner as well as to reduce the circuit scale to a large extent.

Another object of the present invention is to provide a vertical contour correction device which is adapted to furnish preshoots and overshoots in a well balanced manner to the vertical contour with the use of a single 1H delay line.

Briefly described, these and other objects of the present invention are accomplished by the provision of an improved vertical contour correction device which includes an input section for supplying video signals, an output section for outputting the video signal furnished with preshoots and overshoots, a first combining means with two input terminals for combining a first and a second signals input to it, to which video signal is supplied as the first signal, a delaying means for delaying the output of the first combining means by a prescribed duration, a feedback network, connected to the signal transmission line at some point between the output terminal of the delaying means and said signal output section, for supplying to the other input terminal of said first combining means, as the second signal, the signal obtained on said signal transmission line, by successively inverting the polarity corresponding to each interval of said delaying duration and by gradually decreasing the amplitude, in reference to said first signal, and a second combining means for combining the output of said delaying means and said first signal to obtain said first signal as furnished with preshoots and overshoots.

BRIEF DESCRIPTION OF THE DRAWING

These and other objects, features and advantages of the present invention will be more apparent from the following description of a preferred embodiment taken in conjunction with the accompanying drawings in which:

FIGS. 1a to 1c are signal waveform diagrams for illustrating the operation of a prior art vertical contour correction device utilizing a second derivative circuit;

FIG. 2 is a circuit diagram illustrating an example of the prior art vertical contour correction device;

FIG. 5 is a diagram showing another example of the prior art vertical contour correction device;

FIGS. 6a to 6f are the signal waveform diagrams at various parts for illustrating the operation of the circuit shown in FIG. 5;

FIG. 7 is the circuit diagram for an embodiment of the vertical contour correction device in accordance with the present invention;

FIGS. 8a to 8f and FIGS. 9a to 9d are signal waveform diagrams for illustrating the operation of the circuit shown in FIG. 7.

DESCRIPTION OF THE PREFERRED EMBODIMENTS

To facilitate the understanding of the present invention, a brief reference will be made to a prior art vertical contour correction device illustrated in FIGS. 2 to 6.

Referring to FIG. 2, the prior art vertical contour correction device includes a video signal input terminal 10 to which is connected a 1H delay line 12 such as a CCD or the like, a subtraction circuit 14 for subtracting the output signal of the 1H delay line from the video signal, an amplifier 16 for amplifying the output signal of the subtraction circuit 14 with a prescribed amplification factor, and an addition circuit 18 for outputting the sum of the signal from the amplifier 16 and the input video signal.

Figures 3, 4A, 4B, 4C, 4D:
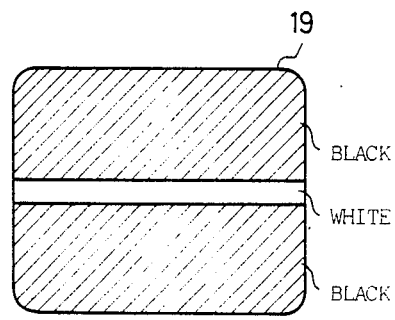
FIG. 3 is an illustration of a television picture for describing the operation of the circuit shown in FIG. 2.
FIGS. 4a to 4d are the signal waveform diagrams at various parts to be used for illustrating the operation of the circuit shown in FIG. 2.

The operation of the prior art circuit shown in FIG. 2 will now be illustrated by referring to FIGS. 3 and 4. In FIG. 3 there is shown a picture 19 on a display such as a cathode ray tube. Consider the case in which a pattern signal is received to forms a picture consisting of "black", "white", and "black" along the vertical direction as shown in FIG. 3. Then, on the input terminal 10 in FIG. 2 there is applied a video signal a as shown by FIG. 4a. In FIG. 4a, S indicates a horizontal synchronizing signal and Y indicates a pattern signal component, while one horizontal scanning period is represented by 1H.

The signal a is delayed by a time 1H by the 1H delay line 12 to produce a signal waveform as shown in FIG. 4b. Then, the signal b is subtracted from signal a by the subtraction circuit 14 to produce a subtracted output c as shown in FIG. 4c. The signal c is adjusted with a prescribed amplification degree by the amplifier 16, and is superposed onto the input signal a by the addition circuit 18. As a result, at the output terminal 20 there is obtained a signal waveform d with an overshoot added at the leading edge and the trailing edge in the vertical direction, as shown in FIG. 4d. It is to be noted that, although the circuit shown in FIG. 2 furnishes overshoots, it is possible to infer readily a circuit which furnishes preshoots.

However, a correction circuit which performs either one of overshoots or preshoots alone is not fully satisfactory because of an unnatural rendering of the reproduced picture, even though it improves the sharpness to some extent. For this reason, it is desirable to have a correction device which furnishes overshoots and preshoots at the same time.

In FIG. 5 is shown an example of vertical contour correction device which is capable of furnishing both overshoots and preshoots at the same time.

This prior art vertical contour correction device comprises an input terminal 22 for the video signal, a first 1H delay line 24 connected to the input terminal 22, a second 1H delay line 26 connected to the output terminal of the first 1H delay line 24, a first inverting amplifier 28 which inverts and amplifies the input video signal, an amplifier 30 which amplifies the output signal of the first 1H delay line 24, a second inverting amplifier 32 which inverts and amplifies the output signal of the second 1H delay line 26, and an adder 34 which outputs the result of summation of the output signals from the first and second inverting amplifiers 28 and 32 and an amplifier 30.

The operation of the circuit shown in FIG. 5 will now be illustrated by referring to FIGS. 6a through 6f. FIG. 6a shows the signal waveform at the input terminal 22 corresponding to a picture as shown in FIG. 3, which is the same as in FIG. 4 shown earlier. This signal waveform a is delayed by 1H by the first 1H delay line 24, to produce a waveform shown in FIG. 6b. It is further delayed by 1H by the second 1H delay line to give a result as shown in FIG. 6c. FIG. 6d shows the signal waveform d obtained by summing the output of the amplifier 30 and the output of the first inverting amplifier 28, and FIG. 6e shows the signal waveform e for the sum of the output of the amplifier 30 and the output of the second inverting amplifier 32. As a result, the output of the addition circuit 34, that is, the signal waveform of the output terminal 36, which is the sum of the waveforms b, d and e is carries the preshoots and the overshoots as shown in FIG. 6f.

Here, the analytical expressions for the signal at various points in FIG. 5 will be explained. The input signal to the input terminal 22 of FIG. 5 is represented by V(t), the output signals of the first and second delay lines by $V_A$, and $V_B$, respectively, the output signals of the amplifiers 28, 30, and 32 by $V_C$, $V_D$, and $V_E$, respectively, and the output signal of the output terminal 36 by $V_F$. Then we have $$V_a = V(t-H) \tag{1}$$

$$V_b = V(t-2H) \tag{2}$$

(Here, H represents the duration of one horizontal scan.) If the amplification degrees of the amplifiers 28, 30, and 32 are called $-g_1$, $g_2$, and $-g_3$, respectively, we have $$V_C = -g^1 \cdot V(t) \tag{3}$$

$$V_d = g^2 \cdot V_A = g^2 \cdot V(t-H) \tag{4}$$

$$V_e = -g^3 \cdot V_B = -g^3 \cdot V(t-2H) \tag{5}$$

Therefore, the output signal $V_F$ is given by $$V_f = V_C + V_D + V_E \tag{6}$$
$$= -g \cdot V(t) + g^2 \cdot V(t-H) - g^3 \cdot V(t-2H)$$

If we choose $$g^1 = g^3 = g, \; g^2 = 1 + 2g$$

Eq. (6) becomes $$V_f = -g \cdot V(t) + (1+2g) \cdot V(t-H) - g \cdot V(t-2H) \tag{7}$$

which may further be represented as $$V_f = V(t-H) + g\{V(t-H) - V(t)\} + g\{V(t-H) - V(t-2H)\} \tag{8}$$

For an input as shown in FIG. 6a, V(t−H) and V(t−2H) are represented by FIGS. 6b and 6c, and the output $V_F$ represented as the sum of the various terms on the right-hand side of Eq. (8) becomes as shown in FIG. 6f. In this way, it becomes possible to attach preshoots and overshoots to the contour portion.

Furthermore, if the mapping function of the first and second 1H delay lines 24 and 26 are called D, and the signal on the input side and the signal on the output side of each 1H delay line are called Vin and Vout, respectively, then we have $$V\text{out}(t) = D \cdot V\text{in}(t) \tag{9}$$

Since $$V\text{out}(t) = V\text{in}(t-H) \tag{10}$$

Eq. (8) above may be represented by $$V_f = DV(t) + g\{DV(t) - V(t)\} + g\{[DV(t)] - D[DV(t)]\} \tag{11}$$

in terms of the mapping function D.

However, a vertical contour correction device like the one shown in FIG. 5 requires two 1H delay lines so that it leads to a disadvantage in that the circuit becomes large-scaled if it is to be constructed utilizing CCD or the like.

The embodiments of the present invention which is aimed at resolving problems like in the foregoing will be described by referring to FIGS. 7 to 11.

Referring now to FIG. 7, a vertical contour correction device embodying the present invention is shown with a reference numeral 40. The vertical contour correction device 40 has a video signal input terminal 42, which is connected via an amplifier 44 to one of the input terminals of a signal combining means, for example, an addition circuit 46. The output terminal of the addition circuit 46 is connected to the input terminal of a 1H delay line 48. The output terminal of the 1H delay line 48 is connected to one of the input terminals of a signal combining circuit, for example, an addition circuit 50, and at the same time, to the input of an amplifier 52 which forms a feedback circuit, and the output terminal of the amplifier 52 is connected to the other input terminal of the addition circuit 46. Further, the input terminal of the signal input terminal 42 is connected to the other input terminal of the addition circuit 51 via an amplifier 54. The output terminal of the addition circuit 50 is connected to a signal output terminal 56.

Next, operation of the circuit in FIG. 7 will be illustrated by referring to FIG. 8.

FIG. 8A shows a video signal applied to the signal input terminal 42. The video signal appears as shown by FIG. 8a when the synchronizing signals are abbreviated for convenience of explanation. In both FIGS. 8A and 8a, 1H stands for the duration of one horizontal scan.

The input signal is amplified by a prescribed amplification by the amplifier 44 to become a signal as shown by FIG. 8b. In addition, the signal is delayed by the time 1H due to its passage through the addition circuit 46 and the 1H delay line 48. The output of the 1H delay line 48 is supplied also to the addition circuit 52, and the signal is inverted with a prescribed amplification degree (a negative amplification degree) to become a signal as shown by FIG. 8c. Since the signal c is applied to the addition circuit 46, the signals b and c are summed there. The resultant signal is represented by $b_1$. The signal $b_1$ is applied again to the addition circuit 46 via the 1H delay line 48 and the amplifier 52, and this cyclic operation repeats itself, due to arrangement of the feedback circuit comprising the amplifier 52, to give rise eventually to a signal as shown by FIG. $8b_2$. At the same time, the output of the amplifier 52 and the output of the 1H delay line 48 become finally as shown by FIGS. $8c_1$ and 8d, respectively.

On the other hand, the signal applied to the signal input terminal 42 is supplied also to the amplifier 54, and it is inverted, at a prescribed amplification (a negative amplification), by the amplifier 54 forming a signal as shown by FIG. 8e, to be applied to the addition circuit 50. Since the signal e is summed with the signal d mentioned earlier in the addition circuit 50, there is obtained at the output terminal 56 a signal as shown by FIG. 8f. The signal f is a vertically contour corrected signal with preshoots and overshoots. It should be noted that there appears signals a to f of FIG. 8 at the corresponding parts of FIG. 7 designated by the symbols a to f.

Next, analytical expressions for the signals at various parts of the circuit in FIG. 7 are set forth. First, the signal levels at the various parts will be represented as follows.

Va: Input signal applied to the signal input terminal 42,
Vb: Output signal of the amplifier 44,
$Vb_2$: Output signal of the addition circuit 46,
$Vb_2$: Output signal of the addition circuit 46,
$Vc_1$: Output signal of the amplifier 52,
Vd: Output signal of the 1H delay line 48,
Ve: Output signal of the amplifier 54, and
Vf: Output signal of the signal output terminal 56.

Then, by calling the amplification of the amplifier 44 (1+2 g), the amplification of the amplifier 52 −g/(1+2 g), the amplification of the amplifier −g, and further, the mapping function of the 1H delay line 48 D, there is obtained $$\left.\begin{array}{l} Vb = (1 + 2g) \cdot Va, \\ Vb_2 = Vb + Vc_1, \\ Vd = D \cdot Vb_2, \\ Vc_1 = \frac{-g}{1 + 2g} \cdot Vd, \\ Ve = -g \cdot Va, \text{ and} \\ Vf = Vd + Ve \end{array}\right\} \quad (13)$$

From Dq. (13), the output $Vb_2$ of the addition circuit 46 is given by $$Vb_2 = Va \cdot (1 + 2g) + Vc_1$$
$$= Va(1 + 2g) + \frac{-g}{1 + 2g} \cdot Vd$$

If one sets $Va = V(t)$, then $$Vb_2 = V(t) \cdot (1 + 2g) + \frac{-g}{1 + 2g} Vd \quad (14)$$

Further, the output $Vd = D \cdot Vb_2$ of the 1H delay line 48 is given from Eqs. (13) and (14) by $$Vd = D\left[(1 + 2g) \cdot V(t) + \frac{-g}{1 + 2g} \cdot D\left[(1 + 2q) \cdot V(t) + \frac{-g}{1 + 2g} \cdot D[\text{-------}]\text{---}\right]\text{---}\right] \quad (15)$$

In addition, the output of the addition circuit 50, namely, the output $Vf$ of the signal output terminal 56, becomes from Eqs. (13) and (15) as $$\begin{aligned} Vf &= Ve + Vd \\ &= -g \cdot Va + Vd \\ &= -g \cdot V(t) + Vd \\ &= -g \cdot V(t) + D\left[(1 + 2g) \cdot V(t) + \frac{-g}{1 + 2q} \cdot \right. \\ &\quad \left. D\left[(1 + 2q) V(t) + \frac{-g}{1 + 2g} \cdot D[\text{-----}]\text{--}\right]\text{---}\right] \end{aligned} \quad (16)$$

By rearranging, Eq. (16) becomes $$Vf = -g \cdot V(t) + D\left[(1 + 2g) \cdot V(t) - g \cdot D \cdot V(t) + \left(\frac{-g}{1 + 2}\right)^2 D[[D\text{---}]..]\cdots\right] \quad (17)$$

Equation 17 can further be rearranged to be represented by $$Vf = -g \cdot V(t) + D[(1 + 2g) \cdot V(t) - g \cdot D \cdot V(t)] + \quad (18)$$
$$\left(\frac{-g}{1 + 2g}\right)^2 D\left[D\left[D\left[(1 + 2g) V(t) + \frac{-g}{1 + 2g} D(\cdots) \cdots\right]\cdots\right]\cdots\right]$$

A comparison of Eq. (18) with Eq. (12) shows that the sum of the first and second terms on the right-hand side of Eq. (18) is error to Eq. (12). This error will now be described by referring to FIG. 9. First FIG. 9a shows the input signal, FIG. 9b shows the output represented by Eq. (12), that is, the output signal of the circuit with two 1H delay lines as shown in FIG. 5, and FIG. 9d shows the output of the circuit (FIG. 7) according to the present invention. Then, by comparing b and d of FIG. 9, the error amount is shown by FIG. 9c. The error amount is represented by the third term of Eq. (18) which could be made very small by properly choosing the value of the amplification g. As a result, the output signal of the output terminal 56 will be approximated by the waveform as shown by FIG. 9b. To this end, it is appropriate to choose the amplification g somewhere around $\frac{1}{2}$.

In this manner, by the cirucit shown in FIG. 7 it becomes possible to carry out vertical contour correction by the use of just one 1H delay line 48.

Figure 10:
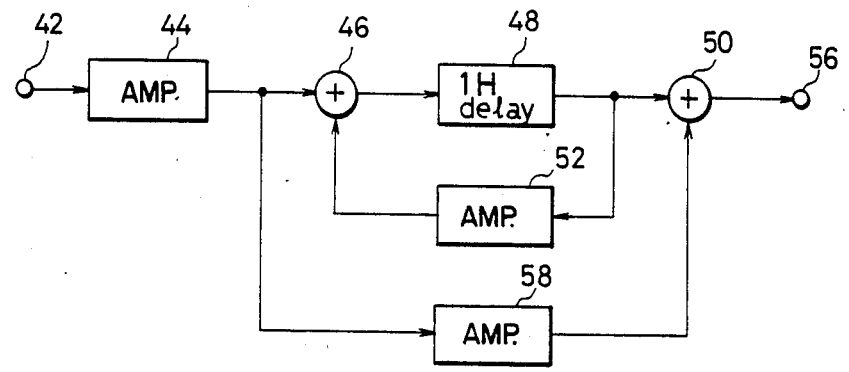
FIGS. 10 and 11 are circuit diagrams showing modifications to the circuit given in FIG. 7.
Figure 11:
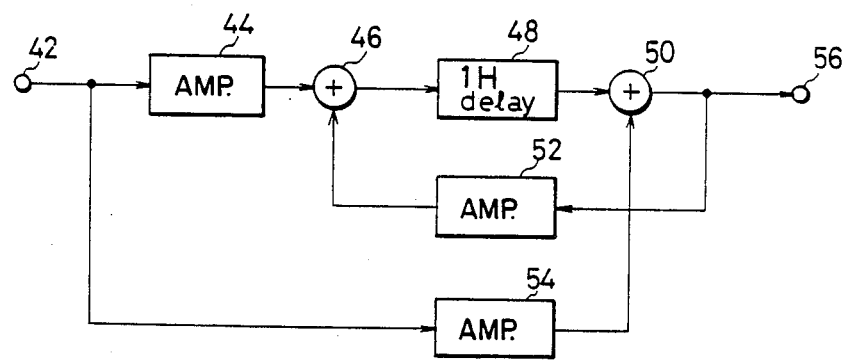

Next, referring to FIGS. 10 and 11, other embodiments of the present invention will be described, with identical symbols for identical parts as shown in FIG. 7. Referring to FIG. 10, it will be seen that the difference from FIG. 7 exists in the introduction of an amplifier, in place of the previous amplifier 54, which is arranged between the amplifier 44 and the addition circuit 50. If the amplificaiton of the amplifier 44 is set at $(1+2g)$ and the amplification for both of the amplifiers 52 and 58 is set at $-g/(1+2g)$, then it will be seen that the same output signal as for FIG. 7 can be generated at the output terminal 56.

It will also be seen that one may arrange the output of the addition circuit 50 to be fed back to the addition cirucit 46 via the amplifier 52.

Moreover, it will be clear from the foregoing description that it is necessary to choose the value of the amplification of the amplifier forming a feedback circuit, so as to supply to the addition circuit 46 a feedback signal with lower amplitude level and opposite polarity relative to the output of the amplifier 44. Furthermore, it will be seen that the furnishing of the preshoots and the overshoots can be accomplished by choosing the ratio in the summation of the signal d of the delaying circuit 48 in the addition circuit 50 and the signal e at the output teminal of the amplifier 54 or 58 so as to cause the signal e to have a lower level and opposite polarity relative to the signal d.

In summary, according to the present invention, it becomes possible to furnish the preshoots and the overshoots to the vertical contour by the use of just one 1H delay line, in contrast to two 1H delay lines required in the prior art device, thus markedly reducing the circuit scale. Moreover, it is possible to accomplish the vertical contour correciton in a reliable manner.

Various modifications will become possible for those skilled in the art after receiving the teachings of the present disclosure without departing from the scope thereof.

What is claimed is:

1. A vertical contour correction device for imparting preshoot and overshoot to a video signal from a video source and correcting the vertical contour of the video signal in the vertical direction as well as in the horizontal direction and providing an output corresponding to said corrected video signal, which comprises:

(a) first amplifier means (44,) for receiving the video signal from said video source and amplifying the same to provide an amplified signal;

(b) first signal combining means (46) for combining the amplified video signal with a feedback signal and for producing a combined third signal thereof;

(c) a single delay means (48) for receiving said combined third signal and for delaying same for producing a 1H delay signal where H is a horizontal scan period of said video signal;

(d) a feedback loop circuit having a second amplifier means (52) for receiving said 1H delay signal from the delay means and for producing the feedback signal;

(e) third amplifier means (54) for receiving the video signal and for producing a fourth signal; and (f) second signal combining means (50) for receiving and combining said 1H delay signal and said fourth signal for producing said output, (g) wherein the amplification factors and the polarities of said first, second and third amplifier means have a predetermined relationship with each other.

2. The vertical contour correction device as claimed in claim 1, wherein (h) the amplification factor of the second amplifier means is selected such that it is smaller than that of the first amplifier means and has a polarity opposite to that of the first amplifier means, and (i) the amplification factor of the third amplifier means is selected such that the amplitude of the fourth signal from said third amplifier means is smaller than the amplitude of the 1H delay signal from the delay means and has a polarity opposite to that of the 1H delay signal, thereby reducing correction error of the vertical contour correction device.

3. The vertical contour correction device as claimed in claim 2, wherein the amplification factor of said first amplifier means is $(1+2g)$, the amplification factor of said second feedback amplifier means is $$\left(-\frac{g}{1+2g}\right),$$

and the amplification factor of said third amplifier means is $(-g)$.

4. The vertical contour correction device as claimed in claim 2, wherein the amplification factor of said first amplifier means is $(1+2g)$, the amplification factor of said second feedback amplifier means is $$\left(-\frac{g}{1+2g}\right),$$

and the amplification factor of said third amplifier means is $$\left(-\frac{g}{1+2g}\right).$$

5. The vertical contour correction device as claimed in claim 1, wherein said delay means is a charge coupled device circuit and said first and second signal combining means are adders.

6. The vertical contour correction device as claimed in claim 2, wherein said delay means is a charge coupled device circuit and said first and second signal combining means are adders.

7. The vertical contour correction device as claimed in claim 3, wherein said delay means is a charge coupled device circuit and said first and second signal combining means are adders.

8. The vertical contour correction device as claimed in claim 4, wherein said delay means is a charge coupled device circuit and said first and second signal combining means are adders.

* * * * *